US012355170B2

(12) United States Patent
Chen et al.

(10) Patent No.: US 12,355,170 B2
(45) Date of Patent: Jul. 8, 2025

(54) MODULAR RISER CARD FOR AN ELECTRONIC DEVICE

(71) Applicant: HEWLETT PACKARD ENTERPRISE DEVELOPMENT LP, Spring, TX (US)

(72) Inventors: Kuan-Wei Chen, Taipei (TW); Vincent Nguyen, Houston, TX (US); Ku-Hsu Nien, Taipei (TW); Jui Lin Chen, Taipei (TW); Hsueh Yu Chao, Taipei (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 385 days.

(21) Appl. No.: 18/065,946

(22) Filed: Dec. 14, 2022

(65) Prior Publication Data

US 2024/0204433 A1 Jun. 20, 2024

(51) Int. Cl.
*H01R 12/72* (2011.01)
*H01R 12/70* (2011.01)
*H01R 12/71* (2011.01)

(52) U.S. Cl.
CPC ....... *H01R 12/721* (2013.01); *H01R 12/7011* (2013.01); *H01R 12/716* (2013.01)

(58) Field of Classification Search
CPC . H01R 12/721; H01R 12/7011; H01R 12/716
USPC .............................................................. 439/65
See application file for complete search history.

(56) References Cited

U.S. PATENT DOCUMENTS 6,261,104 B1 * 7/2001 Leman ................. H01R 12/721 439/752
8,446,729 B2 * 5/2013 Schuette ............... G06F 3/0658 361/752
2003/0049948 A1 * 3/2003 Kim ......................... H05K 1/14 439/61
2006/0158864 A1 7/2006 Gay
2011/0250766 A1 * 10/2011 Chiu .................... H01R 12/737 439/65
2012/0003863 A1 1/2012 Sung et al.
(Continued)

FOREIGN PATENT DOCUMENTS

CA 2022976 A1 * 12/1991 ............... G06K 9/60
CN 101025650 A * 8/2007 ............. G06F 1/185
(Continued)

*Primary Examiner* — Peter G Leigh
(74) *Attorney, Agent, or Firm* — Hewlett Packard Enterprise Patent Department

(57) ABSTRACT

A modular riser card, an electronic device having a modular riser card, and a method of determining a type of modular riser card pin connection are disclosed. The modular riser card includes a circuit board and a removable connector assembly. The circuit board includes a first receptacle having a plurality of first pins. The removable connector assembly includes a connector body defining a second receptacle having a plurality of second pins, and an opening formed in the connector body adjacent to the second receptacle. The connector body is mounted on the circuit board such that the first receptacle protrudes through the opening and is aligned with the second receptacle. The first and second receptacles form a riser card connector that is configured to removably receive an expansion card of an electronic device.

20 Claims, 8 Drawing Sheets

(56) References Cited

U.S. PATENT DOCUMENTS

| | | | | |
|---|---|---|---|---|
| 2012/0033370 | A1* | 2/2012 | Reinke | G06F 13/4068<br>361/748 |
| 2013/0042041 | A1* | 2/2013 | Sun | G06F 13/409<br>710/301 |
| 2013/0294023 | A1* | 11/2013 | Gay | G06F 1/187<br>361/679.31 |

FOREIGN PATENT DOCUMENTS

| | | | | | |
|---|---|---|---|---|---|
| CN | 201107817 | Y | * | 8/2008 | H01R 12/52 |
| CN | 101349935 | A | * | 1/2009 | |
| DE | 102007058724 | B3 | * | 5/2009 | G06F 1/185 |
| GB | 2435351 | A | * | 8/2007 | G06F 1/185 |
| TW | M420780 | U | * | 1/2012 | G06K 19/00 |
| TW | I559118 | B | * | 11/2016 | |

* cited by examiner

ELECTRONIC DEVICE 500
PRIMARY DEVICE BOARD 502
POWER SOURCE CONNECTOR 504
DATA SOURCE CONNECTOR 506
HOST CONTROLLER 508
MODULAR RISER CARD 200
CONTROLLER 310

MODULAR RISER CARD FOR AN ELECTRONIC DEVICE

BACKGROUND

An electronic device such as a computer, a networking device, or the like may include a primary device board (e.g., printed circuit board) having hardware components such as central processor units, resistors, capacitors, or the like to provide some basic function. In order to pursue stronger performance and/or expand functionality of the device, additional hardware components such as an expansion card (e.g., display card) may be coupled to the primary device board. In some electronic devices, the primary device board may include a connector that can directly receive the expansion card. However, in other electronic devices, the primary device board may lack the appropriate number or kind of connectors needed to receive desired expansion card(s), or the connectors may be present but in an inconvenient location. Thus in some electronic devices the primary device board may include another card (or intermediary card) which carries a connector that is suitable for the expansion card to be coupled to the primary device board, thus providing the needed connection point for the expansion card. Such intermediary card is generally referred to as a riser card.

BRIEF DESCRIPTION OF THE DRAWINGS

Various examples will be described below with reference to the following figures.

DETAILED DESCRIPTION

Figure 1:
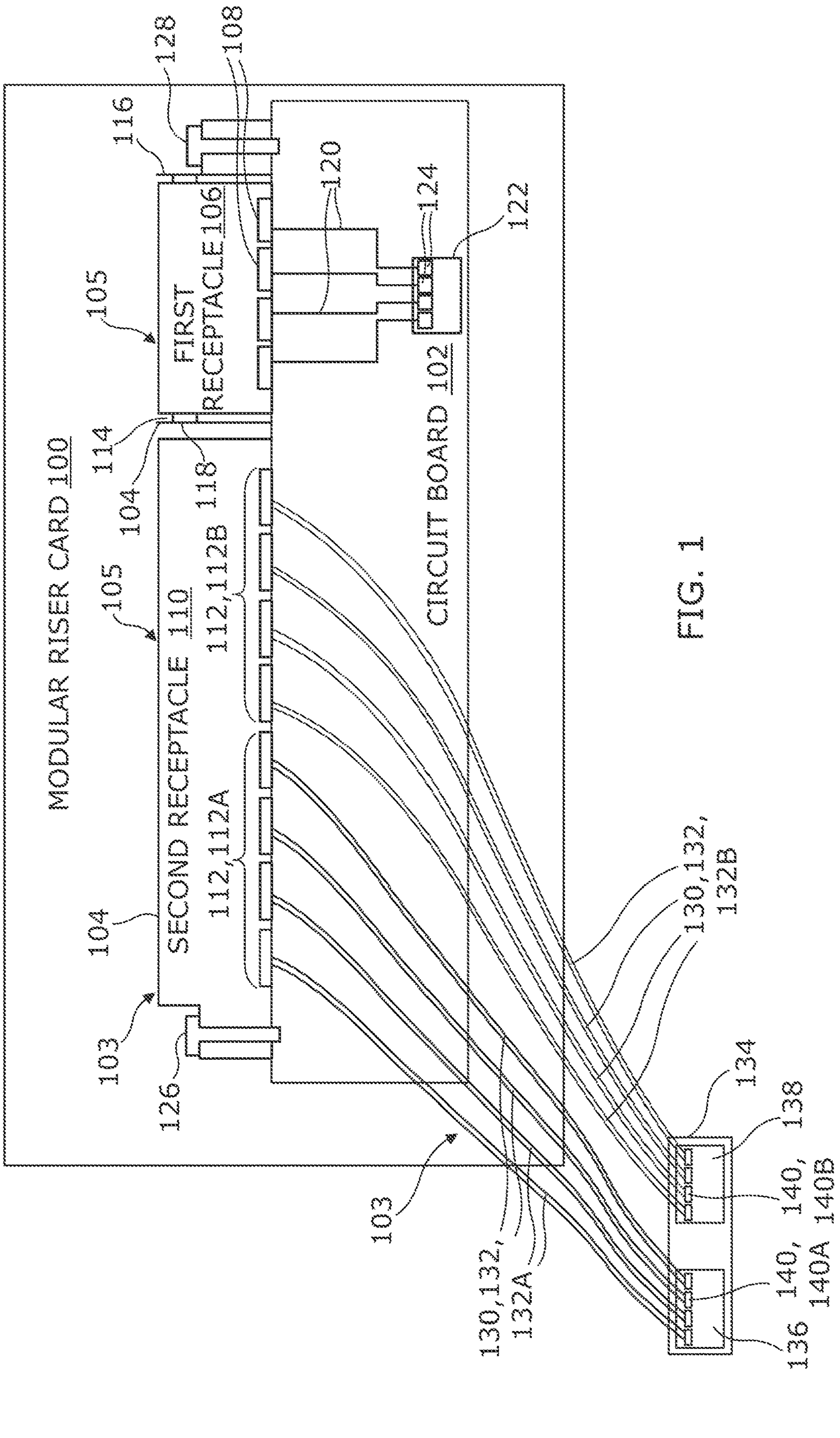
FIG. 1 illustrates a block diagram of a modular riser card according to an example of the present disclosure.

The following detailed description refers to the accompanying drawings. For purposes of explanation, certain examples are described with reference to the components illustrated in FIGS. 1-7. The functionality of the illustrated components may overlap, however, and may be present in a fewer or greater number of elements and components. Moreover, the disclosed examples may be implemented in various environments and are not limited to the illustrated examples. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

As used herein, “modular riser card” refers to an electronic card having a circuit board configured to detachably connect to one of multiple types of connectors (e.g., electrical connectors), where the circuit board includes a power and sideband receptacle portion and the connector includes a data receptacle portion, and where the data receptacle portion, and the power and sideband receptacle portions being further configured to be coupled to a primary system board of an electronic device and removably receive a corresponding connector of an expansion card such that the expansion card is electrically connected to the primary system board via the modular riser card. As used herein, “expansion card” refers to another electronic card having a circuit board and an electrical connector that can be engaged with (e.g., inserted into) the electrical connector of a modular riser card, or a connector (e.g., expansion slot) on an electronic device’s primary device board to add and/or expand functionality of the electronic device.

A riser card typically has a circuit board and a connector. Thus, when the riser card is installed in an electronic device, it may allow inclusion of additional hardware components such as an expansion card (e.g., display card) to the electronic device for improving performance or expanding functionality of the electronic device. Typically, the riser card is first electrically connected to a primary device board of the electronic device, and the expansion card is later connected to the connector of the riser card, thereby allowing the expansion card to be electrically connected to the primary device board through the riser card. Thus, when the expansion card is connected to the riser card, electrical signals from the expansion card may be transferred to the primary device board through the riser card. This may allow a kind of connector (e.g., peripheral component interconnect express (PCI-e) connector) that the primary device board lacks to be added, or the number of such connectors to be expanded, or the locations of such connectors to be repositioned to somewhere more convenient. The expansion card may have multiple types of pin connection, e.g., an 8-pair pin connection or a 16-pair pin connection. Hence, the riser card may need to have compatible (or matching) numbers of pin connection (e.g., an 8-pair pin connection or a 16-pair pin connection) to provision proper functioning of the expansion card with the primary device board via the riser card.

In some use cases, if the riser card that is pre-installed in the electronic device at the factory has one connection configuration (e.g., the 8-pair pin connection) and the expansion card that the customer intends to use in the electronic device has another connection configuration (e.g., the 16-pair pin connection), then such expansion card cannot function properly with the primary device board because of incompatibility of pin connections between the riser and expansion cards. In such use cases, the pre-installed riser card may need to be replaced with a new riser card having the correct connection to provision the expansion card to function properly with the primary device board via the riser card. For example, if an expansion card that is initially connected to the pre-installed riser card needs to be replaced with an advanced expansion card for executing complex workload(s), it is possible that this advanced expansion card is not be compatible with the connection type of the pre-installed riser card (e.g., the pre-installed riser card may have incompatible numbers of pin connection in comparison with pin connection of the advanced expansion card), in which case the pre-installed riser card may need to be replaced with a new riser card with a compatible connector. Hence, the utility of the pre-installed riser card in the electronic device may get restricted to (or become dependent on) a type of pin connection of the expansion card that may be used in the electronic device. Further, replacing the pre-installed riser card with the new riser card may be cumbersome, time consuming, expensive, and depend on availability of inventory of such new compatible riser card. In addition, multiple different types of riser cards may need to be produced, each having different types of connectors, and this may result in additional SKUs being needed and different inventory to be maintained, which can in turn increase costs.

A technical solution to the aforementioned problems includes providing a modular riser card which may be configured/customized to make it compatible with different types of pin connection of the expansion card. For example, the modular riser card may have a circuit board that may be detachably connected to one of multiple types of removable connector assemblies to form different types of riser card connectors on the riser card (e.g., a connector body having either an 8-pair pin connection or a 16-pair pin connection) to match with a connector type requirement (e.g., a connector having either the 8-pair pin connection or the 16-pair pin connection) of the expansion card. The removable connector assembly may, for example, include a data communication cable and a receptacle coupled (e.g., soldered) to a first end of the data communication cable, wherein the receptacle is configured to receive part of the expansion card and a second end of the data communication cable is configured to be connected to the primary device board. In other words, the modular riser card may be customized by assembling one of the multiple types of removable connector assemblies on the circuit board that is compatible with the connector of the expansion card, thereby overcoming the need to replace the entire riser card which is incompatible with the expansion card. Thus, the modular riser card provides flexibility, upgradability, serviceability, and benefit from supply chain in terms of reducing number of riser cards needed in the inventory.

In one or more examples of the present disclosure, the riser card connector that is formed on the modular riser card for connecting with the expansion card includes multiple connector portions, such as a sideband connector portion, a power connector portion, and a data connector portion, and some of these connector portions may be permanently coupled to the circuit board of the modular riser card while other connector portions may be part of the removable connector assembly of the modular riser card. In such examples, when the removable connector assembly is coupled to the circuit board, the connection portion(s) that is(are) part of the removable connection assembly and the connection portion(s) that is(are) permanently mounted on the circuit board together form the riser card connector of the modular riser card that is configured to connect with the expansion card.

In some examples, the connection portions that form the riser card connector include receptacles configured to receive portions (e.g., PCB edge connectors) of the expansion card. These receptacles may include, for example, a sideband and power receptacle and a data receptacle. In some examples, the power and sideband receptacle portion is decoupled (or separated) from the removable connector assembly and mounted on (e.g., soldered to) the circuit board of the riser card, and the data receptacle portion is retained in the removable connector assembly. The data receptacle portion of the removable connector assembly may have a plurality of pins. In some examples, 8-pair electrical lines of the data communication cable of the removable connector assembly are connected (e.g., directly soldered) to a first set of pins among the plurality of pins of the data receptacle portion to form a removable connector assembly having the 8-pair pin connection. In some other examples, 16-pair electrical lines of the data communication cable are connected (e.g., directly soldered) to a first and second set of pins among the plurality of pins of the data receptacle portion to form another removable connector assembly having the 16-pair pin connection. In such examples, the modular riser card may be assembled by: i) mounting one of the removable connector assembly having the 8-pair pin connection receptacle portion with the data communication cable or the 16-pair pin connection receptacle portion with the data communication cable on the circuit board having the power and sideband receptacle portion, and ii) detachably connecting one such removable connector assembly to the circuit board using fasteners.

In one or more examples, the circuit board includes a first receptacle having a plurality of first pins (e.g., power and sideband connector pins) and the removable connector assembly includes a connector body including a second receptacle having a plurality of second pins (e.g., data connector pins) and an opening formed in the connector body adjacent to the second receptacle. The opening in the connector body is configured to receive the first receptacle in a mounted state of the connector body to the circuit board. In some examples, the removable connector assembly is selected from among a plurality of different removable connector assemblies (e.g., a connector having 8-pair pin connection, 16-pair pin connection, 4-pair pin connection, or the like) based on compatibility with the connector of the expansion card that is anticipated to be installed. Further, the selected removable connector assembly is mounted on the circuit board such that the first receptacle is received within (protrudes through) the opening in the connector body and is aligned with the second receptacle. Later, such connector body is detachably connected to circuit board using fasteners, e.g., screws to define the modular riser card.

The plurality of first pins is electrically connected to a power source connector on a primary device board of the electronic device. In some examples, the plurality of first pins is electrically connected to a plurality of third pins of the circuit board via traces in the circuit board. Further, the plurality of third pins is electrically connected to the power source connector via a power cable so as to electrically connect the plurality of first pins to the power source connector. In some other examples, the plurality of first pins is directed coupled to the power source connector on the primary device board via the power cable. In some other examples, the circuit board of the modular riser card may be directly connected to a slot on the primary device board to establish a board-to-board electrical connection. For example, electrical fingers on the circuit board is directly connected to the pins in the slot on the primary device board to establish electrical connection therebetween the circuit board and the primary device board.

The plurality of second pins is electrically connected to a data source connector on the primary device board of the electronic device via a data communication cable. For example, the electrical lines of the data communication cable which is connected (e.g., directly soldered) to at least one of the first set of second pins or the second set of second pins among the plurality of second pins is connected to the primary device board to electrically connect the removable connector assembly to the primary device board.

Further, the expansion card is detachably connected to the first and second receptacles to electrically connect the expansion card to the primary device board via the modular riser card. In one or more examples, the removable connector assembly of the modular riser card may either have the 8-pair pin connection, the 16-pair pin connection, 4-pair pin connection, or the like with the data communication cable depending on the requirements (e.g., based on the number of pin connection) of the expansion card.

In some examples, the modular riser card may further include a controller and an electrical circuit bridging mechanism to determine a type of modular riser card pin connection (e.g., the removable connector assembly having an 8-pair pin connection, a 16-pair pin connection, 4-pair pin connection or the like with the data communication cable) and communicate the same to a host controller of the electronic device. Accordingly, the host controller may perform the power-on self-test of the removable connector assembly and make the modular riser card available for removably receiving the expansion card. In some examples, the electrical circuit bridging mechanism may include a first pair of pads, a second pair of pads, power terminals, and a clip coupled to the connector. The first pair of pads and the second pair of pads are spaced apart from each other and disposed on the circuit board. Further, each pair of pads of the first and second pair of pads is electrically isolated from each other.

In one example, a first pad of the first pair of pads and a third pad of the second pair of pads are connected to a first power terminal and a second power terminal respectively. Further, the first pad and the third pad are connected to a first signal input and a second signal input respectively, of the controller. Accordingly, the controller receives a first electrical signal from the first pad and a second electrical signal from the third pad. In such examples, when the removable connector assembly is mounted on the circuit board, the clip electrically bridges one of the first pair of pads to each other (e.g., bridge the first pad with a second pad of the first pair of pads) or the second pair of pads to each other (e.g., bridge the third pad with a fourth pad of the second pair of pads) to cause a variation (e.g., drop in voltage) in one of the first electrical signal or the second electrical signal to the controller. In other words, the clip electrically bridges one of the first pair of pads to each other or the second pair of pads to each other and causes one of the first electrical signal or the second electrical signal to have a first voltage and the other one of the first electrical signal or the second electrical signal to have a second voltage. Accordingly, the controller may determine a type of modular riser card pin connection based on the variation in one of the first electrical signal received via the first pad or the second electrical signal received via the second pad. Further, the controller may communicate the type of modular riser card pin connection to the host controller.

In another example, a first pad of the first pair of pads and a third pad of the second pair of pads are connected to a first power terminal and a second power terminal respectively. Further, a second pad of the first pair of pads and a fourth pad of the second pair of pads are connected to a first signal input and a second signal input respectively, of the controller. Accordingly, the controller receives a first electrical signal from the second pad and a second electrical signal from the fourth pad. In such examples, when the removable connector assembly is mounted on the circuit board, the clip electrically bridges one of the first pair of pads to each other (e.g., bridge the first pad with the second pad) or the second pair of pads to each other (e.g., bridge the third pad with the fourth pad) to cause a variation (e.g., increase in voltage) in one of the first electrical signal or the second electrical signal to the controller. In other words, the clip electrically bridges one of the first pair of pads to each other or the second pair of pads to each other and causes one of the first electrical signal or the second electrical signal to have a first voltage and the other one of the first electrical signal or the second electrical signal to have a second voltage. Accordingly, the controller may determine the type of modular riser card pin connection based on the variation in one of the first electrical signal received via the first pad or the second electrical signal received via the second pad.

Since the modular riser card may be easily configured to make it compatible with different types of expansion card, the modular riser card provides flexibility, upgradability, serviceability, and benefit from supply chain in terms of reducing number of riser cards needed in the inventory. Further, the modular riser card is inexpensive to assemble, maintain, and replace, since the circuit board having the first receptacle is retained and only the removable connector assembly having the connector body is replaced to form the modular riser card that is compatible with different types of expansion card.

Referring to the Figures, FIG. 1 depicts a block diagram of a modular riser card 100. It should be understood that FIG. 1 is not intended to illustrate specific shapes, dimensions, or other structural details accurately or to scale, and that implementations of the modular riser card 100 may have different numbers and arrangements of the illustrated components and may also include other parts that are not illustrated.

Figures 5A, 5B, 5C:
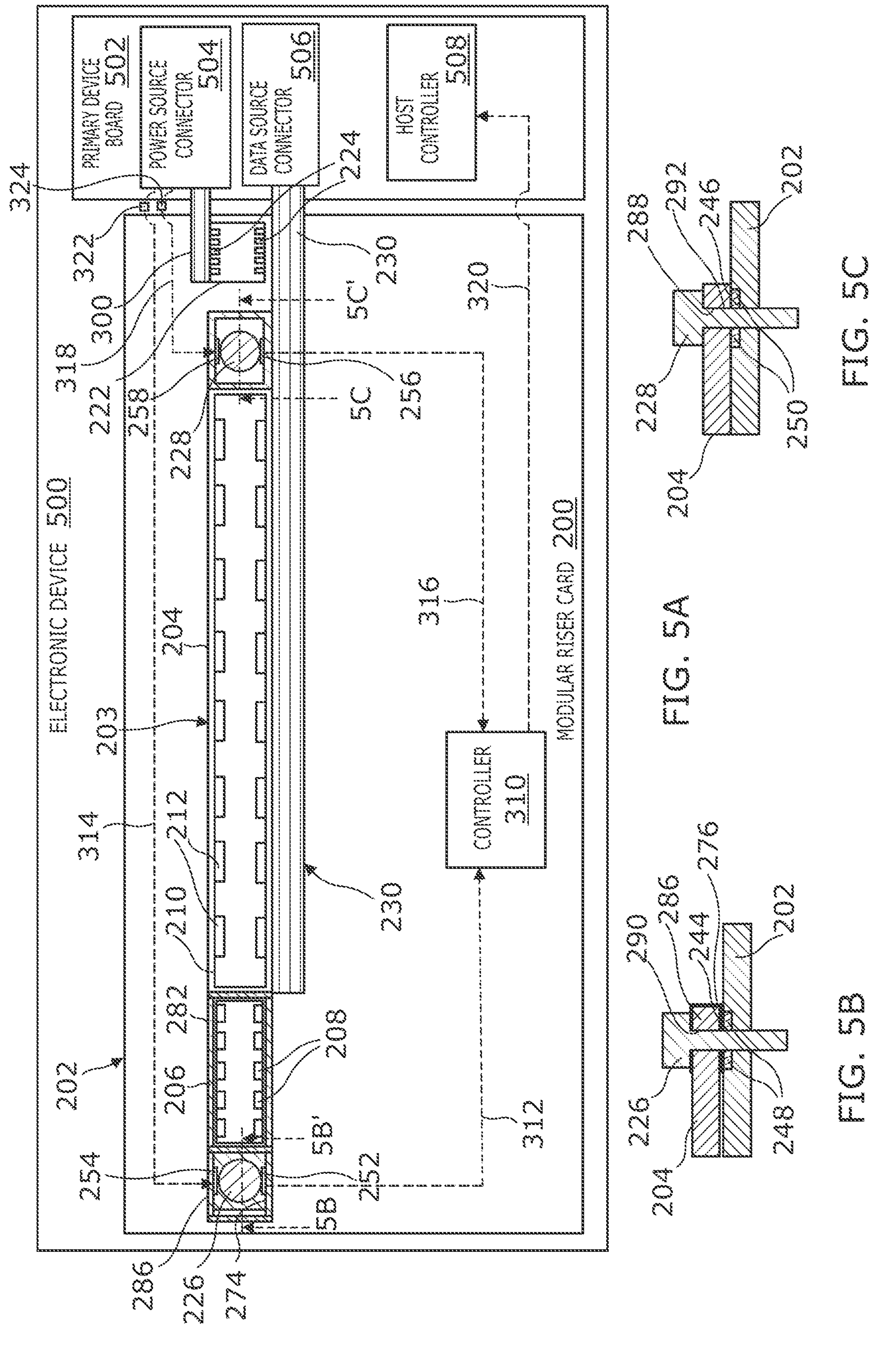
FIG. 5A illustrates a block diagram of an electronic device according to an example of the present disclosure.
FIG. 5B illustrates a cross-sectional view of a portion of a modular riser card of the electronic device of FIG. 5A taken along line 5B-5B' in FIG. 5A according to an example of the present disclosure.
FIG. 5C illustrates a cross-sectional view of another portion of a modular riser card of the electronic device of FIG. 5A taken along line 50-5C' in FIG. 5A according to an example of the present disclosure.

In some examples, the modular riser card 100 may be an auxiliary card (or an intermediary card) of an electronic device 500 (as shown in FIG. 5A). The modular riser card 100 when installed in the electronic device 500 may provision addition of one or more additional hardware components such as an expansion card (e.g., a display card) to the electronic device 500 to satisfy/expand further requirements or functionality of the electronic device 500. In one or more examples, the modular riser card 100 includes a circuit board 102 and a removable connector assembly 103 comprising a connector body 104 removably coupled to the circuit board 102 and a data communication cable 130 coupled to the connector body 104.

The circuit board 102 includes a first receptacle 106 having a plurality of first terminals 108. It may be noted herein that only one first receptacle 106 is described for convenience, but in practice multiple first receptacles 106 could be included one the circuit board 102. The connector body 104 includes a second receptacle 110 having a plurality of second terminals 112. It may be noted herein that only one second receptacle 110 is described for convenience, but in practice multiple second receptacles 110 could be included in the connector body 104. The first receptacle 106 and the second receptacle 110 together form a riser card connector 105 in a coupled state of the connector body 104 to the circuit board 102. In some examples, the first receptacle 106 may function as a power and sideband receptacle portion of the riser card connector 105. In some examples, the second receptacle 110 may function as a data receptacle portion of the riser card connector 105. The first and second terminals 108 and 112 may be electrical terminals for engaging and establishing electrical connections with complementary terminals of a connector of the expansion card. For example, the first and second terminals 108 and 112 may be pins, spring fingers, edge connectors, or other electrical contacts.

Figures 4A, 4B:
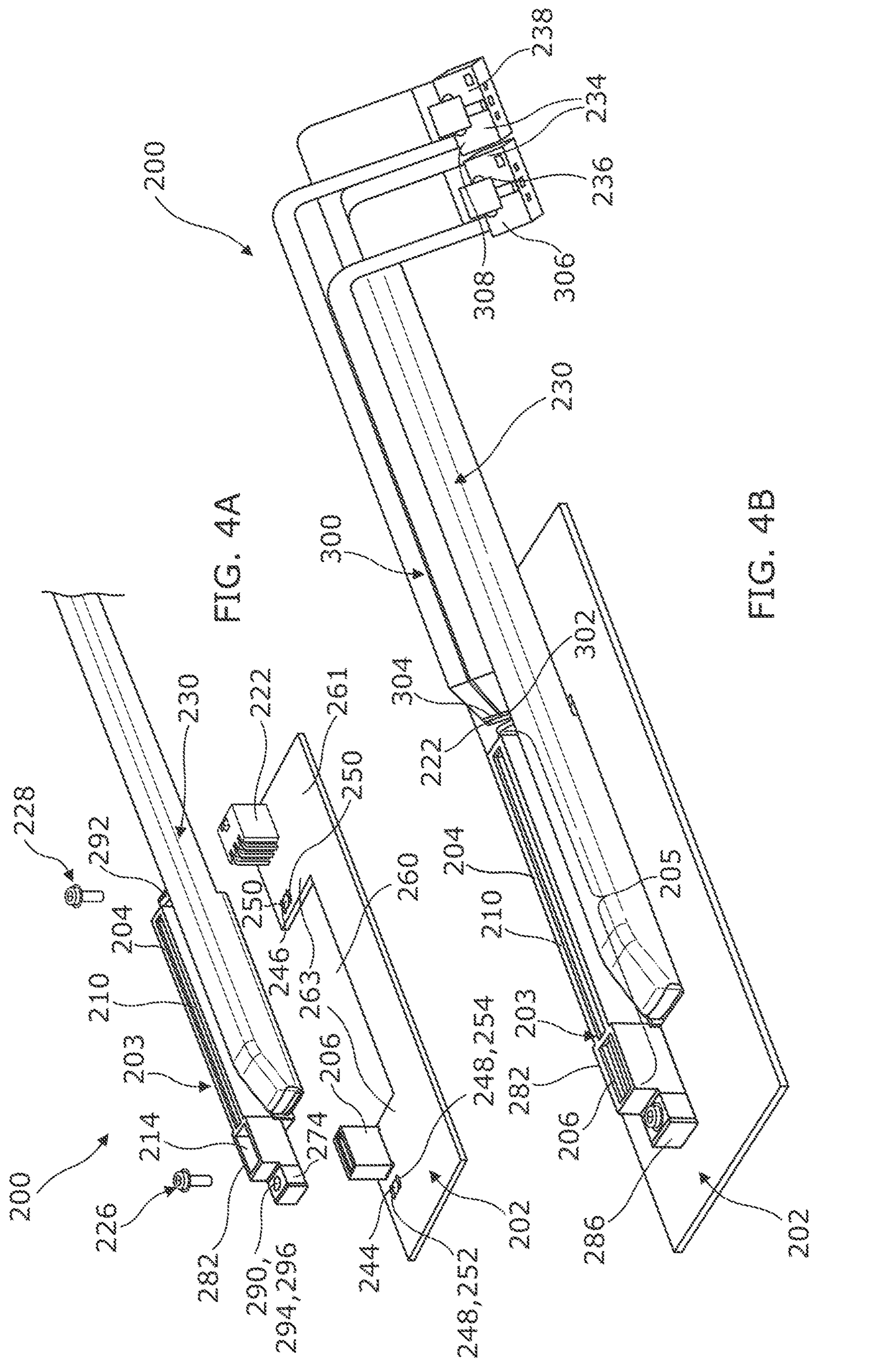
FIG. 4A illustrates an exploded perspective view of a modular riser card having the circuit board of FIGS. 2A-2B, the removable connector assembly of FIGS. 3A-3B, and the clip of FIG. 3C according to an example of the present disclosure.
FIG. 4B illustrates an assembled perspective view of the modular riser card of FIG. 4A according to an example of the present disclosure.

In some examples, the circuit board 102 further includes a plurality of traces 120 and a third receptacle 122 having a plurality of third terminals 124. In such examples, the plurality of first terminals 108 is electrically connected to the plurality of third terminals 124 via the plurality of traces 120. The third receptacle 122 may be configured to removably receive a power cable 300 (as shown in FIGS. 4B and 5A) of the electronic device 500. In such examples, the plurality of first terminals 108 may be electrically connected to a power source connector 504 (as shown in FIG. 5A) on a primary device board 502 (as shown in FIG. 5A) of the electronic device 500 via the plurality of traces 120, the plurality of third terminals 124, and the power cable 300. The connector body 104 further includes an opening 114 formed adjacent to the second receptacle 110. A portion of the connector body 104 that surrounds and defines the opening 114 may be referred to herein as a hollow receptacle 116. In some examples, the hollow receptacle 116 includes supporting lips 118 disposed on an inner surface (not labeled) of the hollow receptacle 116 to provide support to the first receptacle 106. As used herein, "electrically connected" refers to coupling the first component to the second component via a conduction path (e.g., wires, traces, or the like) to allow the transfer of data and power therebetween the first and second components.

The removable connector assembly 103 further includes a data communication cable 130. In some examples, the data communication cable 130 includes electrical lines 132 and a data communication connector 134 having a plurality of fourth terminals 140 which are pre-connected to the electrical lines 132. In such examples, the electrical lines 132 are further connected (e.g., directly soldered) to the plurality of second terminals 112 of the second receptacle 110. In some examples, the data communication connector 134 has a first data communication connector 136 and a second data communication connector 138, each having 8-pair electrical lines 132A which are pre-connected to a plurality of fourth terminals 140A of the first data communication connector 136. In such examples, the 8-pair electrical lines 132A are further connected (e.g., directly soldered) to a first set of second terminals 112A among the plurality of second terminals 112. Further, remaining 8-pair electrical lines 132B, which are pre-connected to a plurality of fourth terminals 140B of the second data communication connector 138 are further connected (e.g., directly soldered) to a second set of second terminals 112B among the plurality of second terminals 112. In one or more examples, the first data communication connector 136 and the second data communication connector 138 may be detectably connected to a data source connector 506 (as shown in FIG. 5A) on the primary device board 502.

In one or more examples, the connector body 104, which is connected to the data communication cable 130 is mounted on the circuit board 102 such that the first receptacle 106 protrudes through the opening 114 and is aligned with the second receptacle 110. For example, the first receptacle 106 extends through the hollow receptacle 116 and contacts the supporting lips 118. In such examples, the supporting lips 118 provide support to the first receptacle 106.

In one or more examples, the modular riser card 100 further includes a first fastener 126, a second fastener 128. In such examples, the connector body 104 is detachably connected to the circuit board 102 via the first fastener 126 and the second fastener 128 to form the modular riser card 100. In some examples, each of the first fastener 126 and the second fastener 128 may be a dielectric fastener, or may have a dielectric coating or other dielectric material applied or coupled thereto.

In one or more examples, the riser card connector 105 formed by the first receptacle 106 and the second receptacle 110 of the modular riser card 100 are configured to removably receive a connector of an expansion card (not shown) of the electronic device 500, such as a PCB edge connector. In one or more examples, depending on a type of a connector (not shown) of the expansion card (e.g., the connector having an 8-pair pin connection, a 16-pair pin connection, of the like), the removable connector assembly 103 may be selected and detachably connected to the circuit board 102 to form the modular riser card 100.

In some examples, when the connector of the expansion card has the 8-pair pin connection, then the connector body 104 having the electrical connection with the electrical lines 132A of the first data communication connector 136 is selected, and detachably connected to the circuit board 102 to form the modular riser card 100. In other words, the removable connector assembly 103 in which the connector body 104 having the first set of second terminals 112A connected to the electrical lines 132A and the second set of second terminals 112B not connected to the electrical lines 132B, is selected and detachably connected to the circuit board 102 to form the modular riser card 100. In some other examples, when the connector of the expansion card has the 16-pair pin connection, then the connector body 104 having the electrical connection with the electrical lines 132 of the first data communication connector 136 and the second data communication connector 138 is selected, and detachably connected to the circuit board 102 to form the modular riser card 100. In other words, the removable connector assembly 103 in which the connector body 104 having the first set of second terminals 112A connected to the electrical lines 132A and the second set of second terminals 112B connected to the electrical lines 132B is selected and detachably connected to the circuit board 102 to form the modular riser card 100. Therefore, the modular riser card 100 may be easily customized depending on the type of connector of the expansion card.

Since the modular riser card 100 may be easily configured to make it compatible with different types of expansion card, the modular riser card 100 provides flexibility, upgradability, serviceability, and benefit from supply chain in terms of reducing number of riser cards needed in the inventory. Further, the modular riser card 100 is inexpensive to assemble, maintain, and replace, since the circuit board 102 is retained and only the removable connector assembly 103 having the connector body 104 is replaced to form different types of the modular riser card 100, which is compatible with different types of the expansion card.

Figure 2A:
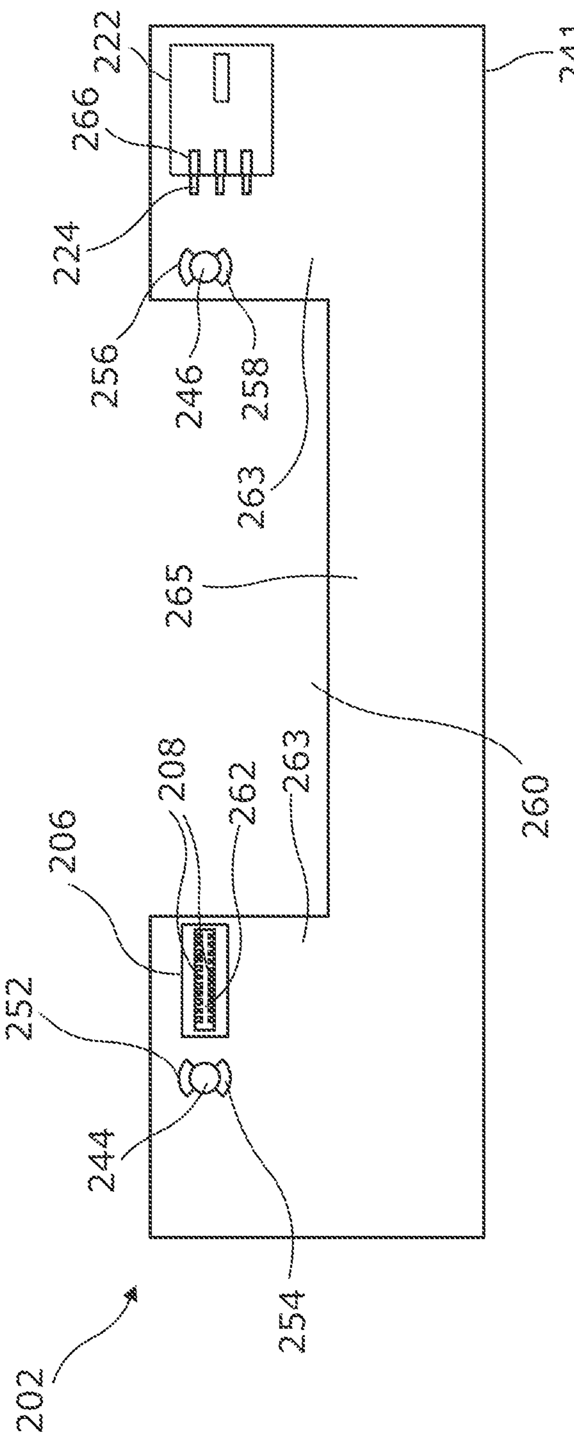
FIG. 2A illustrates a top view of a circuit board according to an example of the present disclosure.
Figure 2B:
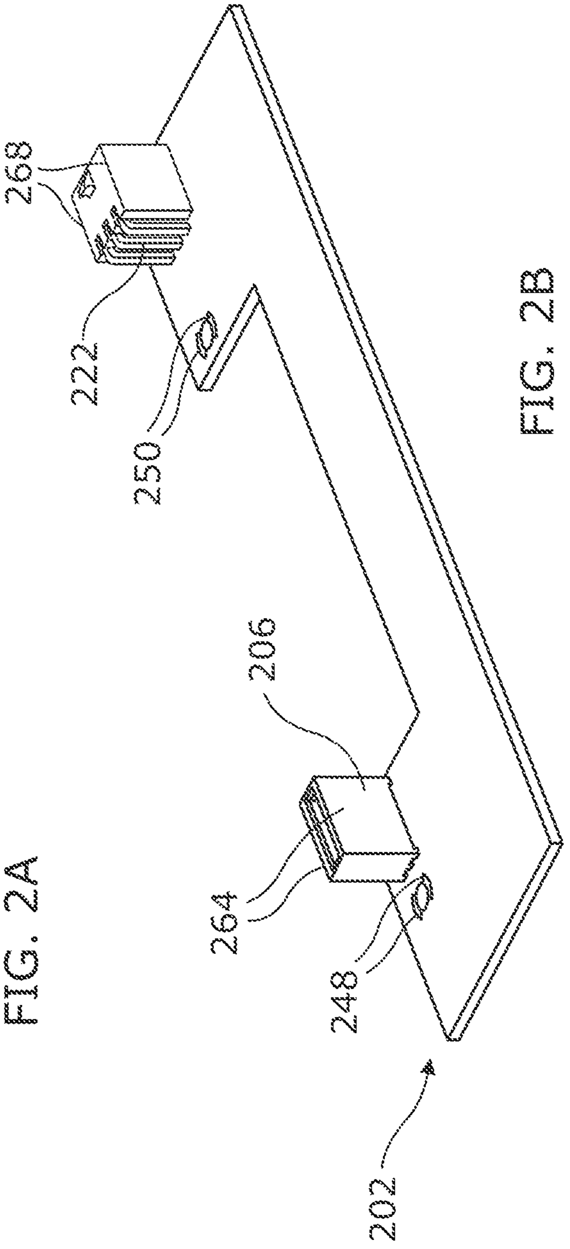
FIG. 2B illustrates a perspective view of a circuit board according to an example of the present disclosure.

Referring to the Figures, FIG. 2A depicts a top view of a circuit board 202 of a modular riser card 200 and FIG. 2B depicts a perspective view of the circuit board 202 of the modular riser card 200. In the description hereinafter, FIGS. 2A-2B are described concurrently for ease of illustration. In one or more examples, the circuit board 202 may be an electronic circuit board, such as a printed circuit board. In the example of FIGS. 2A-2B, the circuit board 202 is shown to have U shaped profile to enable routing of a data communication cable 230 (as shown in FIG. 4C) from a connector body 204 (as shown in FIG. 4C). The shape of the circuit board 202 may vary depending on a design requirement of the modular riser card 200.

The circuit board 202 includes a first receptacle 206, a plurality of traces (as shown in FIG. 1), a third receptacle 222, a pair of mounting holes, e.g., a first mounting hole 244 and a second mounting hole 246, a first pair of pads 248, and a second pair of pads 250. The circuit board 202 may further include a plurality of electronic components, such as capacitors, resistors, or the like, which are not shown for the purpose of ease of illustration and such non-illustration of the plurality of electronic components should not be construed as a limitation of the present disclosure. In the illustrated examples, the circuit board 202 has a U-shaped profile having a pair of legs 263 connected to a body 265 of the circuit board 202 to define a mounting space 260 between the pair of legs 263. In such examples, the first receptacle 206 and the third receptacle 222 are disposed on one leg each of the pair of legs 263 of the circuit board 202.

The first receptacle 206 includes a plurality of first pins 208 (e.g., terminals). In some examples, the plurality of first pins 208 are electrically conductive pins disposed within a recess 262 of the first receptacle 206 and contacting a pair of sidewalls 264 of the first receptacle 206. The first receptacle 206 may function as a power and sideband receptacle portion of the modular riser card 200. The first receptacle 206 is mounted on the circuit board 202 and the plurality of first pins 208 are soldered to the circuit board 202 such that the plurality of first pins 208 establishes electrical connection with first ends of the plurality of traces formed on an inner surface 241 of the circuit board 202.

The third receptacle 222 includes a plurality of third pins 224 (e.g., terminals). In some examples, the plurality of third pins 224 are electrically conductive pins disposed within a recess 266 of the third receptacle 222 and contacting a pair of sidewalls 268 of the third receptacle 222. The third receptacle 222 may function as an intermediate connector of the circuit board 202, which is configured to removably receive a power cable. The third receptacle 222 is mounted on the circuit board 202 and the plurality of third pins 224 are soldered to the circuit board 202 such that the plurality of third pins 224 establishes electrical connection with second ends of the plurality of traces formed on the inner surface 241 of the circuit board 202. Thus, the plurality of first pins 208 is electrically connected to the plurality of third pins 224 via the plurality of traces.

The first mounting hole 244 is formed adjacent to the first receptacle 206 and the second mounting hole 246 is formed adjacent to the third receptacle 222. In one or more examples, each of the first mounting hole 244 and the second mounting hole 246 is a through hole. Each of the first pair of pads 248 and the second pair of pads 250 are electrically conductive pads. In some examples, the first pair of pads 248 and the second pair of pads 250 are formed on an outer surface 261 of the circuit board 202. In particular, the first pair of pads 248 includes a first pad 252 and a second pad 254, which are disposed around the first mounting hole 244 and electrically isolated from each other. Similarly, the second paid of pads 250 includes a third pad 256 and a fourth pad 258, which are disposed around the second mounting hole 246 and electrically isolated from each other.

Figures 3A, 3B, 3C:
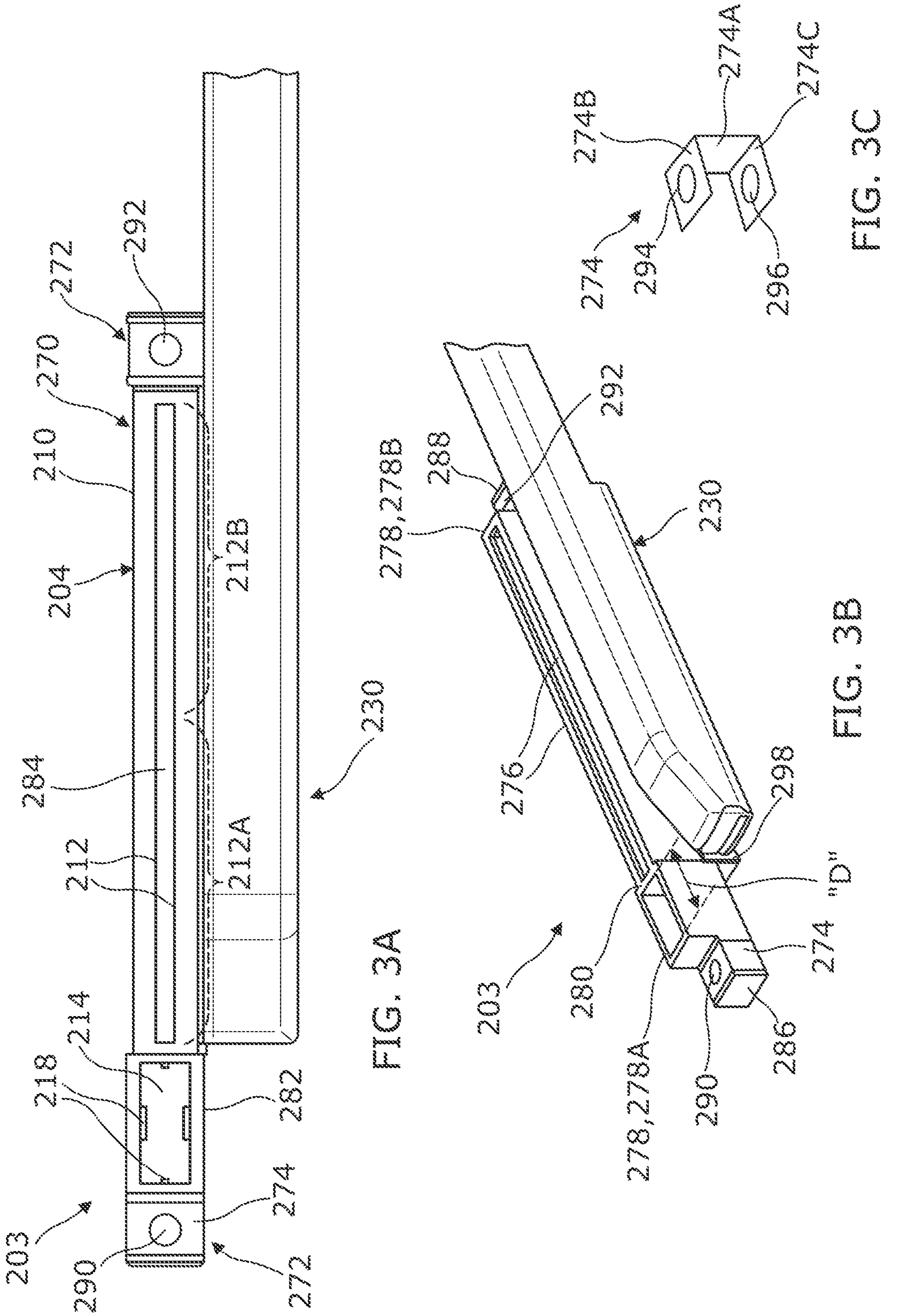
FIG. 3A illustrates a top view of a removable connector assembly having a connector body and a data communication cable according to an example of the present disclosure.
FIG. 3B illustrates a perspective view of a removable connector assembly having a connector body and a data communication cable according to an example of the present disclosure.
FIG. 3C illustrates a perspective view of a clip of a modular riser card according to an example of the present disclosure.

FIG. 3A depicts a top view of a removable connector assembly 203 having a connector body 204 and a data communication cable 230 of a modular riser card 200. FIG. 3B depicts a perspective view of the removable connector assembly 203 having the connector body 204 and the data communication cable 230 of the modular riser card 200. FIG. 3C depicts a perspective view of a clip 274 of the modular riser card 200. In the description hereinafter, FIGS. 3A-3C are described concurrently for ease of illustration. In one or more examples, the connector body 204 is a peripheral component interconnect express (PCI-e) connector. The connector body 204 includes a receptacle section 270 and a mounting section 272.

The connector body 204 has a first pair of sidewalls 276 and a second pair of sidewalls 278 which are connected to define the receptacle section 270. In such examples, the connector body 204 further has a third sidewall 280 disposed parallel to the second pair of sidewalls 278 at an offset distance "D" from one sidewall 278A of the second pair of sidewalls 278, and connected to the first pair of sidewalls 276 to define a second receptacle 210 and an empty receptacle 282. In some examples, the second receptacle 210 includes a plurality of second pins 212. The plurality of second pins 212 are electrically conductive pins disposed within a recess 284 of the second receptacle 210 and contacting a portion of first pair of sidewalls 276 corresponding to the second receptacle 210. The second receptacle 210 may function as a data receptacle portion of the modular riser card 200. The empty receptacle 282 includes an opening 214 formed adjacent to the second receptacle 210. The opening 214 has a width which is equal to a width of the first receptacle 206 (as shown in FIG. 2A). In such examples, the empty receptacle 282 further includes supporting lips 218 disposed on an inner surface (not labeled) of the empty receptacle 282.

The connector body 204 further has a pair of mounting posts, e.g., a first mounting post 286 and a second mounting post 288. The pair of mounting posts defines the mounting section 272 of the connector body 204. In some examples, the first mounting post 286 extends from the sidewall 278A of the second pair of sidewalls 278, and the second mounting post 288 extends from another sidewall 278B of the second pair of sidewalls 278. In some examples, the first mounting post 286 has a third mounting hole 290. Similarly, the second mounting post 288 has a fourth mounting hole 292. In one or more examples, each of the third mounting hole 290 and the fourth mounting hole 292 is a through hole.

In some examples, the modular riser card 200 further includes a clip 274. Referring to FIG. 3C, the clip 274 has a U-shaped profile. For example, the clip 274 includes a peripheral side wall 274A, a top wall 274B, and a bottom wall 274C, where the top wall 274B and the bottom walls 274C are connected to the peripheral side wall 274A to define the U-shaped profile. Further, the top wall 274B has a fifth mounting hole 294 and the bottom wall 274C has a sixth mounting hole 296 which are aligned to each other. The clip 274 may be disposed on one of the first mounting post 286 or the second mounting post 288. In the illustrated example, the clip 274 is disposed on the first mounting post 286 such that the fifth mounting hole 294 and the sixth mounting hole 296 of the clip 274 are aligned with the third mounting hole 290 of the first mounting post 286. In other words, the top wall 274B seats on a top surface (not labeled) of the first mounting post 286 and the bottom wall 274C seats on a bottom surface (not labeled) of the first mounting post 286.

The data communication cable 230 includes electrical lines (not shown). In such examples, a first end of one or more electrical lines is connected (e.g., directly soldered) to one or more second pins of the plurality of second pins 212 of the connector body 204. Further, a second end of each of the electrical lines is pre-connected to a corresponding fourth pin among a plurality of fourth pins (as shown in FIG. 1A) of a data communication connector 234 (as shown in FIG. 4B). In some examples, a first set of second pins 212A among the plurality of second pins may be directly soldered to 8 lines among the electrical lines of the data communication cable 230, and a second set of second pins 212A among the plurality of second pins 212 may be directly soldered to another 8 lines among the electrical lines of the data communication cable 230. Accordingly, in such examples, the connector body 204 may have a 16-pair pin connection with the data communication cable 230.

The modular riser card 200 may further include a shield 298 coupled to a bottom surface (not labeled) of the connector body 204 such that the shield 298 conceals the pin connection between the plurality of second pins 212 and the electrical lines 232. The data communication cable 230 is further bend to turn radially upwards from the bottom surface of the connector body 204 and extends parallel contacting one of the side wall of the first pair of sidewalls 276.

FIG. 4A depicts an exploded perspective view of a modular riser card 200 and FIG. 4B depicts an assembled perspective view of the modular riser card 200. In the description hereinafter, FIGS. 4A-4B are described concurrently for ease of illustration. In one or more examples, the modular riser card 200 is an auxiliary card (or an intermediary card) of an electronic device 500 (as shown in FIG. 5A). The modular riser card 200 when installed in the electronic device 500 may provision addition of one or more additional hardware components such as an expansion card (e.g., a display card) to the electronic device 500 to satisfy/expand further requirements or functionality of the electronic device 500. In one or more examples, the modular riser card 200 includes a circuit board 202 and a removable connector assembly 203 having a connector body 204 and a data communication cable 230. In some examples, the modular riser card 200 is a peripheral component interconnect express (PCI-e) card.

As discussed in the example of FIGS. 3A-3C, the plurality of second pins 212 of the connector body 204 is connected to the electrical lines of the data communication cable 230. Accordingly, the connector body 204 has a 16-pair pin connection with the data communication cable 230. In such examples, the connector body 204 is mounted on the circuit board 202 such that the first mounting hole 244 and third mounting holes 290 are aligned to each other and the second mounting hole 246 and the fourth mounting hole 292 are aligned to each other. Further, when the connector body 204 is mounted on the circuit board 202, the first receptacle 206 protrudes through the opening 214 and is aligned with the second receptacle 210. In particular, the first receptacle 206 protrudes through the empty receptacle 282 of the connector body 204 and is aligned with the second receptacle 210. In such examples, the first receptacle 206 and the second receptacle 210 together form a riser card connector 205 that is configured to removably receive an expansion card of an electronic device. In such examples, the clip 274 disposed on the first mounting post 286 contacts the first pair of pads 248 and electrically bridges the first pad 252 of the first pair of pads 248 to the second pad 254 of the first pair of pads 248. Since the clip 274 is coupled only to the first mounting post 286 and disposed contacting the first paid of pads 248, the second pair of pads 250 are still electrically isolated from each other.

The data communication cable 230 extends outwards from the bottom surface of the connector body 204 and the circuit board 202 to the outer surface 261 of the circuit board 202 via the mounting space 260 formed between the pair of legs 263 of the circuit board 202. As discussed in the example of FIG. 1, the data communication cable 230 includes a data communication connector 234. In some examples, the data communication connector 234 has a first data communication connector 236 and a second data communication connector 238, each data communication connector having a plurality of fourth pins which are pre-connected to the 8-pair electrical lines. Further, the first data communication connector 236 and the second data communication connector 238 are configured to connect to a data source connector 506 on a primary device board 502 (as shown in FIG. 5A).

The modular riser card 200 further includes a first fastener 226 and a second fastener 228. In such examples, the connector body 204 is detachably connected to the circuit board 202 via the first fastener 226 and the second fastener 228 to form the modular riser card 200. In particular, the first fastener 226 extends through the third mounting hole 290 in the connector body 204 and the first mounting hole 244 in the circuit board 202 to detachably connect the connector body 204 to the circuit board 202. Additionally, the first fastener 226 extends through the fifth mounting hole 294 and the sixth mounting hole 296 of the clip 274 to retain the clip 274 with the first mounting post 286.

The modular riser card 200 further includes a power cable 300. In some examples, the power cable 300 includes a first power connector 302 and a second power connector 304 disposed at a first end of the power cable 300, and a third power connector 306 and a fourth power connector 308 disposed at a second end of the power cable 300. In such examples, the first power connector 302 and the second power connector 304 are connected to the third receptacle 222 of the circuit board 202. Further, the third power connector 306 and the fourth power connector 308 are configured to connect to a power source connector 504 on the primary device board 502.

Figure 5D:
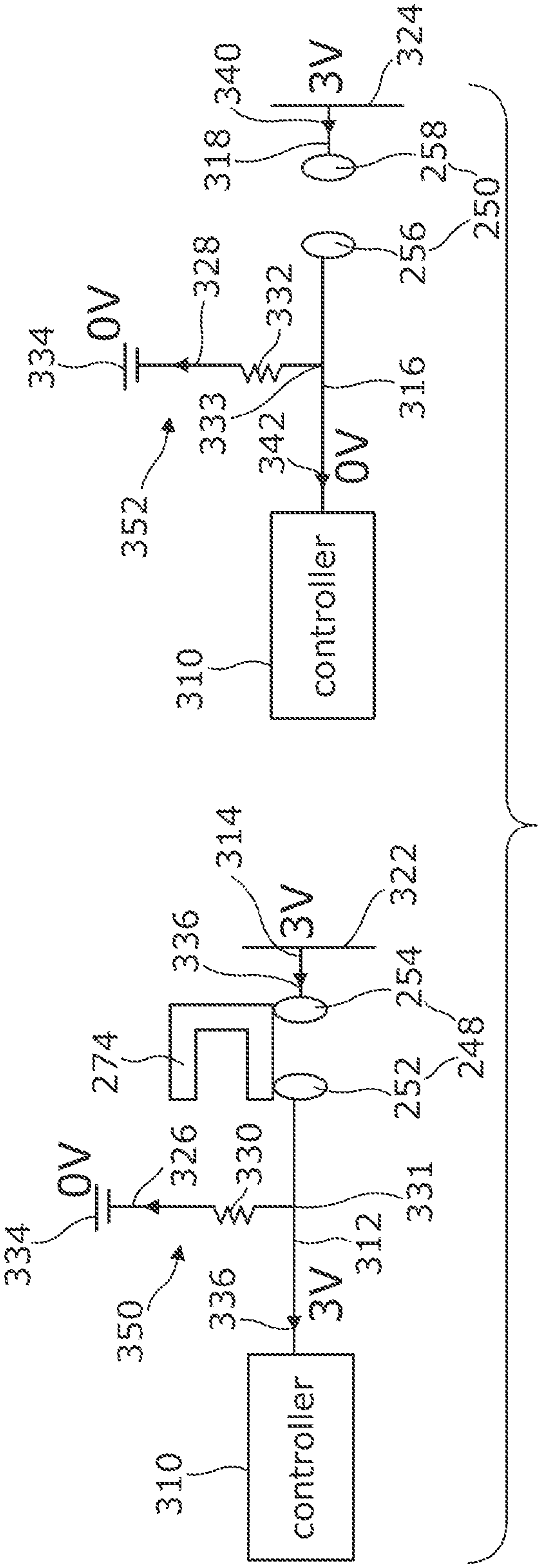
FIG. 5D illustrates a block diagram of a controller and electrical circuits of the modular circuit board of FIG. 5A according to an example of the present disclosure.

FIG. 5A depicts a block diagram of an electronic device 500. FIG. 5B depicts a cross-sectional view of a portion of a modular riser card 200 of the electronic device 500, taken along line 5B-5B' in FIG. 5A. FIG. 5C depicts a cross-sectional view of another portion of the modular riser card 200 of the electronic device 500, taken along line 5C-5C' in FIG. 5A. FIG. 5D depicts a controller 310 and electrical circuits of the modular riser card 200. In the description hereinafter, FIGS. 5A-5D are described concurrently for ease of illustration. The electronic device 500 may be a computer (e.g., server, storage device, etc.), networking device (e.g., transceiver, wireless access point, router, switch, etc.), or the like. In the example of FIG. 5A, the electronic device 500 is a server. In some examples, the electronic device 500 includes a chassis and electronic components such as a primary device board 502 (e.g., a motherboard), and a modular riser card 200.

The primary device board 502 may be a printed circuit board of the electronic device 500 having electrical circuitry integrated therein, such as conductive strips disposed on or in dielectric sheets, and to which one or more integrated circuits (IC), one or more input/outputs ports, power ports, electronic components, or the like are attached. In some examples, the primary device board 502 further includes a power source connector 504, a data source connector 506, and a host controller 508, e.g., a complex programmable logic device (CPLD).

As discussed herein, the modular riser card 200 includes a circuit board 202, a removable connector assembly 203, and a clip 274. The removable connector assembly 203 includes a connector body 204, a data communication cable 230, and a power cable 300. In some examples, the circuit board 202 includes a first receptacle 206, a first pair of pads 248, a first mounting hole 244 (as labeled in FIG. 2A), a second mounting hole 246 (as labeled in FIG. 2A), a third receptacle 222, and a controller 310. The first receptacle 206 includes a plurality of first pins 208, and the third receptacle 222 includes a plurality of third pins 224. The connector body 204 includes a second receptacle 210, a first mounting post 286, a second mounting post 288, and an empty receptacle 282 including an opening 214. In some examples, the second receptacle 210 includes a plurality of second pins 212. The first mounting post 286 includes a third mounting hole 290 and the second mounting post 288 includes a fourth mounting hole 292. As discussed herein, electrical lines in the data communication cable 230 is coupled to the plurality of second pins 212 of the second receptacle 210. The electrical lines in the data communication cable 230 is further electrically connected to the data source connector 506 on the primary device board 502. As discussed herein, the modular circuit board has a 16-pair pin connection with the data communication cable 230. The plurality of first pins 208 in the first receptacle 206 is electrically connected to the plurality of third pins 224 of the third receptacle 222. In such examples, the power cable 300 is connected to the third receptacle 222 and the power source connector 504 to supply electric power to the modular riser card 200. Further, the clip 274 is disposed on the first mounting post 286 such that the fifth mounting hole 294 (as labeled in FIG. 3C) and the sixth mounting hole 296 (as labeled in FIG. 3C) of the clip 274 are aligned with the third mounting hole 290.

Further, the connector body 204 is mounted on the circuit board 202 such that the first receptacle 206 of the circuit board 202 protrudes through the empty receptacle 282 of the connector body 204 and align with the second receptacle 210. Further, the first mounting hole 244 is aligned with the third mounting hole 290. Similarly, the second mounting hole 246 is aligned with the fourth mounting hole 292. In such examples, a first fastener 226 is disposed on the first mounting post 286 such that it extends through the sixth mounting hole 296, the third mounting hole 290, the fifth mounting hole 294, and the first mounting hole 244. Similarly, a second fastener 228 is disposed on the second mounting post 288 such that it extends through the fourth mounting hole 292 and the second mounting hole 246. In one or more examples, the first fastener 226 and the second fastener 228 is used to detachably connect the connector body 204 of the removable connector assembly 203 to the circuit board 202. In some examples, the first receptacle 206 and the second receptacle 210 together form a riser card connector 205 that is configured to removably receive an expansion card of the electronic device 500. Additionally, the first fastener 226 further couples the clip 274 to the first mounting post 286. As used herein "detachably connect" refers to connecting a first component to a second component in a manner that allows the two components to be separated non-destructively if desired; for example, detachable connections may be established via fasteners that allow for unfastening, e.g., screwing/unscrewing, friction coupling, latches that can be unlatched, frictional connections, or other types of connections that can be reversed without destroying or damaging the parts involved. Referring to FIG. 5B, the clip 274 disposed on and coupled to the first mounting post 286 electrically bridges a first pad 252 of the first pair of pads 248 to a second pad 254 of the first pair of pads 248. Referring to the FIG. 5C, since the clip 274 is not disposed on and coupled to the second mounting post 288, a third pad 256 of the second pair of pads 250 is electrically isolated from a fourth pad 258 of the second pair of pads 250. It should be understood that which mounting post the clip 274 is disposed on may vary depending on which type of removable connector assembly 203 e.g., the connector body 204 is being used. That is, the type of connector body 204 that is being coupled to the circuit board 202 may be encoded based on where the clip 274 is coupled. With two mounting posts 286 and 288 to which the clip 274 could be coupled, this allows for up to three types of connectors body 204 to be encoded: e.g., a first type of the connector body 204 may be indicated by disposing the clip 274 on only the first mounting post 286, a second type of the connector body 204 may be indicated by disposing the clip 274 on only the second mounting post 288, and a third type of connector body 204 could be indicated by disposing two clips 274 on both the first and second mounting post 286 and 288. In some examples, the first type of connector body 204 may be an indication of a 16-pair pin connection, the second type of connection body 204 may be an indication of an 8-pair pin connection, and the third type of connection body 204 may be an indication of a 4-pair pin connection, for example. In the figures and description herein, it is assumed for sake of convenience that the clip 274 is coupled to the first mounting post 286, but this is just for convenience of description.

In one or more examples, the first pair of pads 248 is part of a first electrical circuit 350 (which is incomplete), and when the clip 274 bridges the first pair of pads 248 the first electrical circuit 350 is completed and an electrical signal flows along the first electrical circuit 350 through the first pair of pads 248. The controller 310 has a terminal (not shown) coupled to a node of this first electrical circuit 350 and thus can sense whether the first pair of pads 248 is bridged by sensing a voltage at this node. In some examples, the first electrical circuit 350 is configured to pull up a voltage at the node from 0V to some non-zero value when the clip 274 bridges the first pair of pads 248, while in other examples the first electrical circuit 350 is configured to pull down a voltage at the node from some non-zero value to 0V when the clip 274 bridges the first pair of pads 248. In either case, the controller 310 can detect the change in voltage and from this identify that the first pair of pads 248 is bridged. Similarly, the second pair of pads 250 is part of a second electrical circuit 352 (which is incomplete) coupled to the controller 310, and the controller 310 can detect when the clip 274 bridges the second pair of pads 250 based on detecting a change in voltage at a node in the second electrical circuit 352. Accordingly, the controller 310 may be configured to determine which type of connector is present based on which pair of pads is bridged (e.g., based on the voltages at the respective node).

Figure 6:
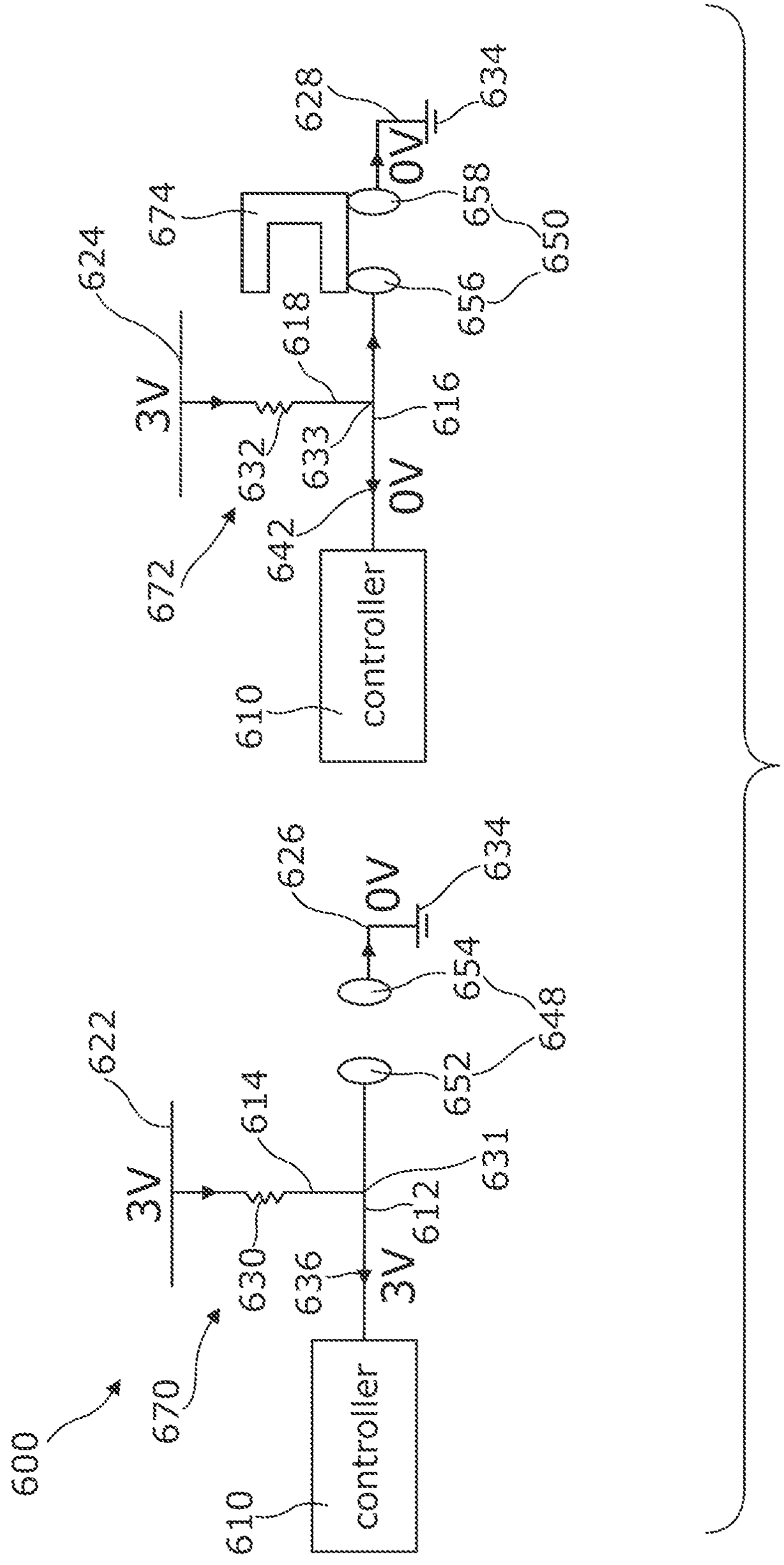
FIG. 6 illustrates a block diagram of a controller and electrical circuits of a modular circuit board according to another example of the present disclosure.

As noted above, in some examples the first electrical circuit 350 and the second electrical circuit 352 include the first pair of pads 248 and the second pair of pads 250 respectively, which are configured to pull up a voltage from 0V to a non-zero voltage when bridged by the clip 274, whereas in other examples the first electrical circuit 350 and the second electrical circuit 352 are configured to pull down a voltage from a non-zero value to 0V when bridged by the clip 274. FIG. 5D illustrates an example in which the circuits are configured to pull the voltage up when bridged, whereas FIG. 6 illustrates another example in which the circuits are configured to pull the voltage down.

Referring to FIG. 5D, the first electrical circuit 350 is formed by a first electrical path 326, a first pair of pads 248, a first power terminal 322, and a first electrical lane 314. Similarly, the second electrical circuit 352 is formed by a second electrical path 328, a second pair of pads 250, a second power terminal 324, and a second electrical lane 318. In some examples, the first electrical path 326 extends from a first pad 252 of the first pair of pads 248 to a ground connector 334 via a first node 331 and a first resistor 330. Similarly, the second electrical path 328 extends from a third pad 256 of the second pair of pads 250 to the ground connector 334 via a second pad 333 and a second resistor 332. Further, the first electrical lane 314 extends from a second pad 254 of the first pair of pads 248 and is electrically connected to the first power terminal 322, and the second electrical lane 318 extends from a fourth pad 258 of the second pair of pads 250 and is electrically connected to the second power terminal 324. In such examples, the first power terminal 322 and the second power terminal 324 may be further connected to one of i) the power source connector 504 or ii) to the third receptacle 222 or iii) the power cable 300, to supply the electric signal to the second pad 254 and the fourth pad 258 respectively.

In some examples, the controller 310 is electrically connected to the first electrical circuit 350 and the second electrical circuit 352. For example, the controller 310 is electrically connected to: i) the first pad 252 of the first pair of pads 248 via a first signal input 312 and ii) the third pad 256 of the second pair of pads 250 via a second signal input 316. In particular, the first signal input 312 of the controller 310 is connected to the first node 331 of the first electrical path 326 and the second signal input 316 of the controller 310 is connected to the second node 333 of the second electrical path 328. As illustrated in FIG. 5A, the controller 310 is further connected to the host controller 508 of the electronic device 500 via a control signal 320.

In one or more examples, the clip 274 electrically bridges one of the first pair of pads 248 or the second pair of pads 250 to each other. For example, the clip 274 electrically bridges the first pair of pads 248 to each other, e.g., the first pad 252 is electrically bridged to the second pad 254. However, the second pair of pads 250 are electrically isolated from each other, e.g., the third pad 256 is electrically isolated from the fourth pad 258. In such examples, in a state of the modular riser card 200 is connected to the primary device board 502 of the electronic device 500: i) a first electrical signal 336 may flow from the first power terminal 322 to the controller 310 via the first signal input 312. When the clip 274, bridges the second pad 254 to the first pad 252, the first power terminal 322 is coupled to the first node 331 (via the clip 274) and thus a voltage at the first node 331 is pulled up by the first power terminal 322. Assuming the resistance of the clip 274 and connections with the pads 252 and 254 are negligible, the voltage of the first node 331 will be pulled up to the same voltage as the first power terminal 322 (e.g., 3V in FIG. 5D). If there is a non-negligible resistance between the first power terminal 322 and the first node 331, then that resistance, together with the resistor 330, will form a voltage divider and as a result the voltage of the first node 331 will be pulled up to the an intermediate voltage between the ground and the voltage of the first power terminal 322 (e.g., 2V). On other hand, when the clip 274 is not present at the first electrical circuit 350, the first node 331 is coupled to the ground 334 via resistor 330 with no other voltage source coupled thereto and thus the voltage of the first node 331 will be 0V. Accordingly, the controller 310 may receive a first electrical signal 336 from the first pad 252 e.g., via the first node 331, which may have a first non-zero voltage (e.g., about 3V or 2V), in response to the clip 274 bridging the first pair of pads 248. However, since the second pair of pads 250 are electrically isolated from each other, the second power terminal 324 cannot supply an electrical signal 340 to the controller 310. In such examples, the second node 333 which is connected to the controller 310 and the ground connector 334 (via the resistor 332) is at 0V. Since there is no voltage source coupled to the second node 333 (e.g., via the second pair of pads 250), the ground connector 334 pulls the voltage of the second node 333 down to 0V. Accordingly, the controller 310 may receive a second electrical signal 342 from the second signal input 316, which may be at a 0V, in response to electrical isolation of the second pair of pads 248.

In one or more examples, the controller 310 after receiving the first and second electrical signals 336, 342 may turn a counter corresponding to the first electrical signal 336 to “0”, as there is an increase in voltage in the first electrical signal 336 and retain a counter corresponding to the second electrical signal 342 to “1”, as the voltage remains the same in the second electrical signal 342. In other words, the controller 310 may retain the counter data as “1”, when it receives the electrical signal having no voltage (e.g., 0V) or same voltage, and turns the counter data to “0”, when it receives the electrical signal having some voltage (e.g., 3V) (or increase in voltage from 0V to 3V). Further, the controller 310 may determine a type of modular riser card connection based on the counter data corresponding to the first electrical signal 336 and the second electrical signal 342. For example, the controller 310 may compare the counter data corresponding to the first electrical signal 336 and the second electrical signal 342 with a pre-stored counter data corresponding to a stored first electrical signal and a stored second electrical signal to determine the type of modular riser card connection. In some examples, the pre-stored counter data may be stored in a memory (not shown) of the modular riser card 200. A sample pre-stored counter data are represented in table-1 below for reference.

TABLE 1

| STORED FIRST ELECTRICAL SIGNAL | STORED SECOND ELECTRICAL SIGNAL | TYPE OF MODULAR RISER CARD CONNECTION |
|---|---|---|
| 0 | 1 | Connector having a 16-pair pin connection with the data communication cable |

TABLE 1-continued

| STORED FIRST ELECTRICAL SIGNAL | STORED SECOND ELECTRICAL SIGNAL | TYPE OF MODULAR RISER CARD CONNECTION |
|---|---|---|
| 1 | 0 | Connector having an 8-pair pin connection with the data communication cable |
| 1 | 1 | Connector not installed |

In one or more examples, based on the comparison of counter data with the pre-stored counter data, the controller 310 may determine a type of modular riser card connection e.g., the connector body 204 having a 16-pair pin connection with the data communication cable 230. Referring back to FIG. 5A, the controller 310 may further communicate the type of modular riser card connection to the host controller 508 via the control signal 320. In such examples, the host controller 508 may instruct a manageability controller (not shown) to perform a power-on self-test of the connector body 204 and upon successful validation of the 16-pair pin connection of the connector body 204 make the modular riser card 100 available for removably receiving an expansion card (e.g., a display card, not shown). In some examples, the expansion card may have a 16-pair pin connection. In one or more examples, the first receptacle 206 and the second receptacle 210 forming the riser card connector 205 of the modular riser card 100 may receive a connector corresponding to the expansion card. Since the expansion card has compatible number of pin connection (e.g., 16-pair pin connection) in comparison with the pin connection (16-pair pin connection) of the connector body 204, the modular riser card 200 may provision proper functioning of the expansion card with the primary device board 502. In some examples, the expansion card may be a PCI-e card.

FIG. 6 depicts a controller 610 and electrical circuits of another modular riser card 600. In one or more examples, the modular riser card 600 is substantially similar to that of a modular riser card 200 discussed in the example of FIGS. 5A-5D with only difference is in the electrical circuits. For example, the modular riser card 600 includes the controller 610, a first electrical circuit 670, and a second electrical circuit 672.

The first electrical circuit 670 is formed by a first electrical lane 614, a first pair of pads 648 disposed on a circuit board (not shown) of the modular riser card 600, a first power terminal 622, and a first electrical path 626. Similarly, the second electrical circuit 672 is formed by a second electrical lane 618, a second pair of pads 650 disposed on the circuit board, a second power terminal 624, and a second electrical path 628. In some examples, the first electrical lane 614 extends from a first pad 652 of the first pair of pads 648 and is electrically connected to the first power terminal 622 via a first node 631 and a first resistor 630, and the second electrical lane 618 extends from a third pad 656 of the second pair of pads 650 and is electrically connected to the second power terminal 624 via a second node 633 and second resistor 632. Similarly, the first electrical path 626 extends from a second pad 654 of the first pair of pads 648 to a ground connector 634, and the second electrical path 628 extends from a fourth pad 658 of the second pair of pads 650 to the ground connector 634.

In some examples, the controller 610 is electrically connected to the first electrical circuit 670 and the second electrical circuit 672. For example, the controller 610 is electrically connected to: i) the first pad 652 of the first pair of pads 648 via a first signal input 612 and ii) the third pad 656 of the second pair of pads 650 via a second signal input 616. In particular, the first signal input 612 of the controller 610 is connected to the first node 631 of the first electrical lane 614 and the second signal input 616 of the controller 610 is connected to the second node 633 of the second electrical lane 618. The modular riser card 600 may further include a clip 674 coupled to the connector body and mounted on the circuit board corresponding to the first electrical circuit 670 to electrically bridge the first pair of pads 648 or the second electrical circuit 672 to electrically bridge the second pair of pads 650.

In one or more examples, when the connector body is mounted on the circuit board corresponding to the second electrical circuit 672, the clip 674 electrically bridges the second pair of pads 650 to each other, e.g., the third pad 656 is electrically bridged to the fourth pad 658. However, the first pair of pads 648 are electrically isolated from each other, e.g., the first pad 652 is electrically isolated from the second pad 654. In such examples, in a state of the modular riser card 600 is connected to a primary device board of the electronic device, the first power terminal 622 may provide an electrical signal to the first pad 652 and the second power terminal 624 may provide the electrical signal to the third pad 656. Since the first pair of pads 648 is electrically isolated from each other, the electrical signal provided by the first power terminal 622 may not reach the ground connector 634. In such examples, the voltage at the first node 631 to which the controller 610 is coupled is at the same voltage as the first power terminal 622 (e.g., 3V in FIG. 6), as the first node 631 is coupled to the first power terminal 622 with no other voltage source coupled thereto. Accordingly, the controller 610 may receive a first electrical signal 636 from the first pad 252 e.g., from the first node 631, which may have a first non-zero voltage (e.g., about 3V, in FIG. 6).

However, since the clip 674 electrically bridges the second pair of pads 650 to each other, the ground connector 634 may become electrically connected to the second node 633 via the second pair of pads 650. In other words, when the clip 674 bridges the third pad 656 to the fourth pad 658, the second electrical lane 618, which is at a first non-zero voltage is connected to the ground connector 634, which is at 0V. Thus, the ground connector 634 pulls the voltage of the second node 633 node down to the same voltage as the ground 634 (e.g., 0V in FIG. 6). Because the second node 633 is coupled to the controller 610, the controller 610 may sense the change in voltage of the second node 633 from the high voltage (e.g., 3V) to the ground voltage (e.g., 0V). In other words, the controller 610 may receive a second electrical signal 642 from the second pad 654 e.g., via the second node 633, which may be at a 0V.

In one or more examples, the controller 610 after receiving the first and second electrical signals 636, 642 may retain a counter data corresponding to the first electrical signal 636 as "1" as the voltage remains same (e.g., 3V) in the first electrical signal 636, and turn a counter data corresponding to the second electrical signal 642 to "0" as there is a drop in voltage in the second electrical signal 642. In other words, the controller 610 may retain the counter data as "1", when it receives the electrical signal having some voltage (e.g., 3V) and turns the counter data to "0", when it receives the electrical signal having no voltage (e.g., 0V) (or the drop in voltage from 3V to 0V). Further, the controller 610 may determine a type of modular riser card connection based on the counter data corresponding to the first electrical signal 636 and the second electrical signal 642. For example, the controller 610 may compare the counter data corresponding to the first electrical signal 636 and the second electrical signal 642 with a pre-stored counter data corresponding to a stored first electrical signal and a stored second electrical signal to determine the type of modular riser card connection. In some examples, the pre-stored counter data may be stored in a memory (not shown) of the modular riser card 600. A sample pre-stored counter data are represented in table-2 below for reference.

TABLE 2

| STORED FIRST ELECTRICAL SIGNAL | STORED SECOND ELECTRICAL SIGNAL | TYPE OF MODULAR RISER CARD CONNECTION |
|---|---|---|
| 0 | 1 | Connector having a 16-pair pin connection with the data communication cable |
| 1 | 0 | Connector having an 8-pair pin connection with the data communication cable |
| 1 | 1 | Connector not installed |

In one or more examples, based on the comparison of counter data with the pre-stored counter data, the controller 610 may determine a type of modular riser card connection e.g., a connector body of the modular riser card 600 having an 8-pair pin connection with a data communication cable. In one or more examples, the controller 610 may further communicate the type of modular riser card connection to a host controller. In some examples, the expansion card may have an 8-pair pin connection. Since the expansion card has compatible number of pin connection (e.g., 8-pair pin connection) in comparison with the pin connection (e.g., 8-pair pin connection) of the connector body, the modular riser card 600 may provision proper functioning of the expansion card with the primary device board. In some examples, the expansion card may be a PCI-e card.

Figure 7:
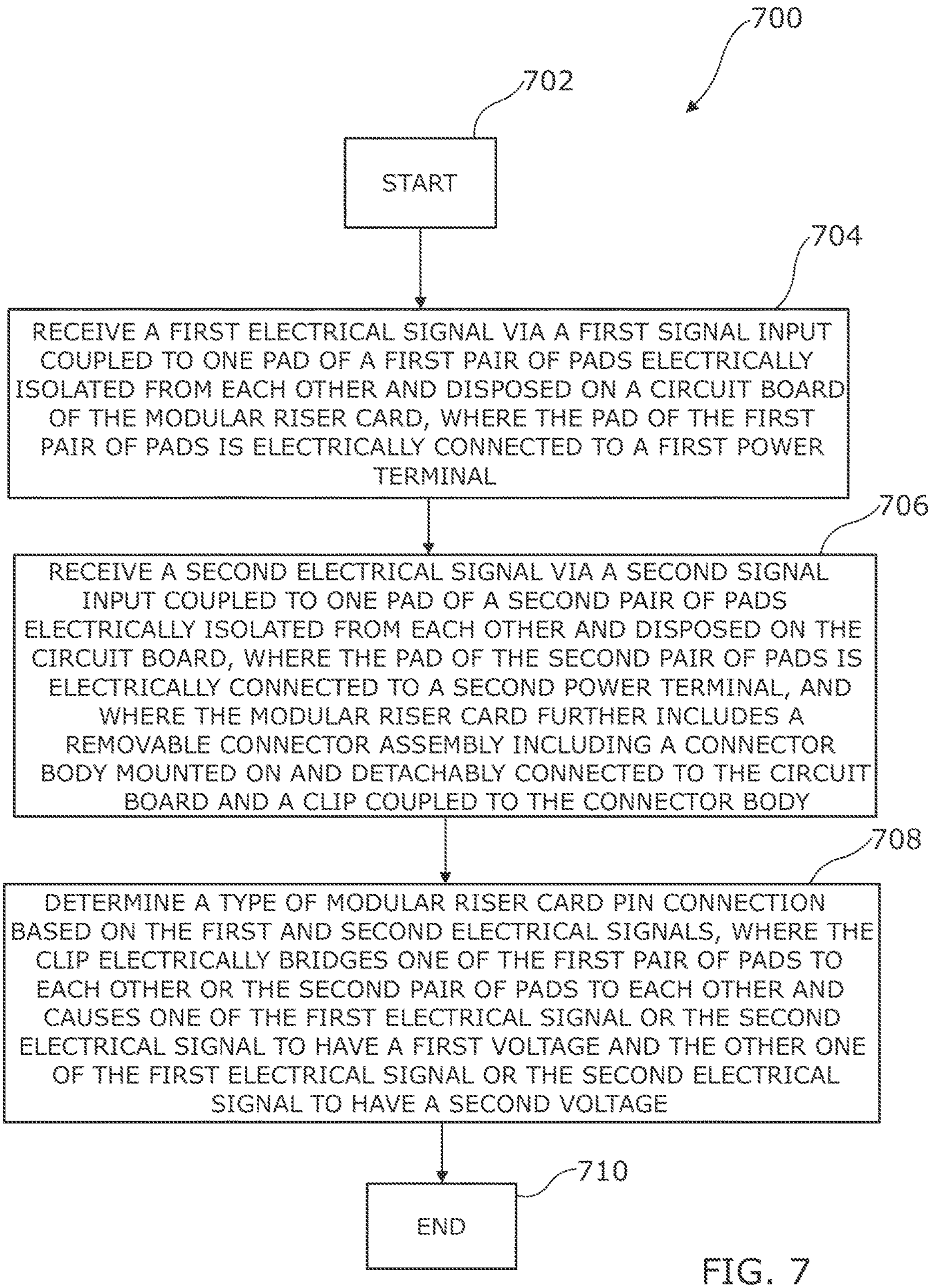
FIG. 7 is a flowchart depicting a method of determining a type of modular riser card pin connection according to one example of the present disclosure.

FIG. 7 depicts a flowchart depicting a method 700 of determining a type of modular riser card connection in an electronic device. It may be noted herein that the method 700 is described in conjunction with FIGS. 1-2, 3A-3B, 4A-4B, and 5A-5D, for example. The method 700 starts at block 702 and continues to block 704. In one or more examples, the method 700 is performed by a controller of the modular riser card.

At block 704, the method 700 includes receiving a first electrical signal via a first signal input coupled to one pad of a first pair of pads electrically isolated from each other and disposed on a circuit board of the modular riser card. In some examples, the one pad of the first pair of pads is a first pad, which is further electrically connected to a first power terminal and a second pad of the first pair of pads is electrically connected to a ground connector. The method 700 continues to block 706.

At block 706, the method 700 includes receiving a second electrical signal via a second signal input coupled to a third pad of a second pair of pads electrically isolated from each other and disposed on the circuit board. In some examples, the other pad of the second pair of pads is a third pad, which is electrically connected to a second power terminal and a fourth pad of the second pair of pads is electrically connected to the ground connector. In some examples, the modular riser card further includes a removable connector assembly having a connector body mounted on and detachably connected to the circuit board and a clip coupled to the connector body. The method 700 continues to block 708.

At block 708, the method 700 includes determining a type of modular riser card connection based on the first and second electrical signals. In some examples, the clip electrically bridges one of the first pair of pads (e.g., the first pad to the second pad) to each other or the second pair of pads to each other (e.g., the third pad to the fourth pad) and causes one of the first electrical signal or the second electrical signal to have a first voltage and the other one of the first electrical signal or the second electrical signal to have a second voltage. In some examples, the controller may retain a counter data of the first electrical signal or the second electrical signal to "1", if the controller senses no voltage (e.g., 0V) at the first pad (or first node) or the third pad (or second node) via the first signal input or the second signal input respectively. In some examples, the controller may turn the counter data of the first electrical signal or the second electrical signal to "0", if the controller senses some voltage (e.g., 3V) at the first pad or the third pad via the first signal input or the second signal input respectively. Accordingly, the controller may compare the counter data corresponding to the first electrical signal and the second electrical signal with a pre-stored counter data corresponding to a stored first electrical signal and a stored second electrical signal to determine a type of modular riser card connection. In some example, when the connector body has a 16-pin connection with a data communication cable, then the clip is disposed such that the first pair of pads are electrically connected to each other. In such cases, the controller senses some voltage (e.g., 3V) at the first node via the first signal input and accordingly turn the counter data to "0". Since the clip is not disposed contacting the second pair of pads, the controller may not sense voltage (e.g., 0V) at the second node via the second signal input and accordingly retain the counter data to "1". As discussed in the example of FIG. 5D, the controller may compare the first and second electrical signals counter values with the stored first and second electrical signal counter values and determine that the type of modular riser card connection is the 16-pair pin connection with the data communication cable. In such examples, the controller may further communicate the modular riser card connection to a host controller of an electronic device. In some examples, the first receptacle and the second receptacle forming the riser card connector of the modular riser card may receive an expansion card having a 16-pair pin connection and provision proper functioning of the expansion card with a primary device board of the electronic device. In some examples, the expansion card may be a PCI-e card. The method 700 ends at block 710.

Since the modular riser card may be easily configured to make it compatible with different types of expansion card, the modular riser card provides flexibility, upgradability, serviceability, and benefit from supply chain in terms of reducing number of riser cards needed in the inventory. Further, the modular riser card is inexpensive to assemble, maintain, and replace, since the circuit board having the first receptacle is retained and only the removable connector assembly having the connector body is replaced to form the modular riser card that is compatible with different types of expansion card. Since the modular riser card can be assembled (formed) with different types of removable connector assemblies, there may be no need to maintain or produce different types of riser cards, each having different types of connectors. This may result in reduction of SKUs being needed and different inventory to be maintained, which can in turn decrease costs.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A modular riser card comprising:

a circuit board comprising a first receptacle having a plurality of first pins; and a removable connector assembly comprising a connector body defining a second receptacle having a plurality of second pins, and an opening formed in the connector body adjacent to the second receptacle, wherein the connector body is mounted on the circuit board such that the first receptacle protrudes through the opening and is aligned with the second receptacle, and wherein the first and second receptacles form a riser card connector that is configured to removably receive an expansion card of an electronic device.

2. The modular riser card of claim 1, wherein the circuit board further comprises a first mounting hole and a second mounting hole, wherein the connector body further comprises a third mounting hole and a fourth mounting hole, and wherein the first and third mounting holes are aligned to each other and the second and fourth mounting holes are aligned to each other.

3. The modular riser card of claim 2, further comprising a first fastener and a second fastener, and wherein the first fastener extends through the first and third mounting holes and the second fastener extends through the second and fourth mounting holes to detachably connect the connector body to the circuit board.

4. The modular riser card of claim 2, wherein the circuit board further comprises a first pair of pads electrically isolated from each other and disposed at the first mounting hole, and a second pair of pads electrically isolated from each other and disposed at the second mounting hole.

5. The modular riser card of claim 4, further comprising a controller, wherein a first pad of the first pair of pads is electrically connected to a first signal input of the controller and a second pad of the first pair of pads is electrically connected to a first power terminal, and wherein a third pad of the second pair of pads is electrically connected to a second signal input of the controller and a fourth pad of the second pair of pads is electrically connected to a second power terminal.

6. The modular riser card of claim 5, further comprising a clip coupled to the connector body adjacent to one of the third mounting hole or the fourth mounting hole and electrically bridge one of the first pair of pads to each other or the second pair of pads to each other to electrically connect the first power terminal to the first signal input or to electrically connect the second power terminal to the second signal input.

7. The modular riser card of claim 6, wherein the controller is configured to, in a state of the modular riser card connected to the electronic device: i) determine a type of modular riser card pin connection based on whether a first electrical signal is received via the first signal input or a second electrical signal is received via the second signal input, and ii) communicate the type of modular riser card pin connection to a host controller of the electronic device.

8. The modular riser card of claim 7, wherein the type of modular riser card pin connection comprises one of an 8-pair pin connection or a 16-pair pin connection.

9. The modular riser card of claim 1, wherein the removable connector assembly further comprises a data communication cable comprising electrical lines connected to the plurality of second pins.

10. The modular riser card of claim 1, wherein the connector body is a peripheral component interconnect express (PCI-e) connector, and wherein the expansion card is a PCI-e card.

11. An electronic device comprising:

a primary device board; and a modular riser card comprising:

a circuit board comprising a first receptacle having a plurality of first pins; and a removable connector assembly comprising a connector body defining a second receptacle having a plurality of second pins, and an opening formed in the connector body adjacent to the second receptacle, wherein the connector body is mounted on the circuit board such that the first receptacle protrudes through the opening and is aligned with the second receptacle, and a data communication cable comprising electrical lines connected to the plurality of second pins, wherein the plurality of first pins is electrically connected to a power source connector on the primary device board, wherein the data communication cable is electrically connected to a data communication connector on the primary device board, and wherein the first and second receptacles form a riser card connector that is configured to removably receive an expansion card and electrically connect the expansion card to the primary device board.

12. The electronic device of claim 11, further comprising a first fastener and a second fastener, wherein the circuit board further comprises a first mounting hole and a second mounting hole, wherein the connector body further comprises a third mounting hole and a fourth mounting hole, wherein the first and third mounting holes are aligned to each other and the second and fourth mounting holes are aligned to each other, and wherein the first fastener extends through the first and third mounting holes and the second fastener extends through the second and fourth mounting holes to detachably connect the connector body to the circuit board.

13. The electronic device of claim 12, wherein the circuit board further comprises a first pair of pads electrically isolated from each other and disposed at the first mounting hole, and a second pair of pads electrically isolated from each other and disposed at the second mounting hole.

14. The electronic device of claim 13, further comprising a controller, wherein a first pad of the first pair of pads is electrically connected to a first signal input of the controller and a second pad of the first pair of pads is electrically connected to a first power terminal, and wherein a third pad of the second pair of pads is electrically connected to a second signal input of the controller and a fourth pad of the second pair of pads is electrically connected to a second power terminal.

15. The electronic device of claim 14, further comprising a clip coupled to the connector body adjacent to one of the third mounting hole or the fourth mounting hole and electrically bridge one of the first pair of pads to each other or the second pair of pads to each other to electrically connect the first power terminal to the first signal input or to electrically connect the second power terminal to the second signal input.

16. The electronic device of claim 15, wherein the controller is configured to, in a state of the modular riser card connected to the primary device board of the electronic device: i) determine a type of modular riser card pin connection based on whether a first electrical signal is received via the first signal input or a second electrical signal is received via the second signal input, and ii) communicate the type of modular riser card pin connection to a host controller of the electronic device, and wherein the type of modular riser card pin connection comprises one of an 8-pair pin connection or a 16-pair pin connection.

17. The electronic device of claim 11, wherein the plurality of first pins is electrically connected to the power source connector via a power cable or traces formed in the circuit board.

18. The electronic device of claim 11, wherein the plurality of second pins is directly soldered to the electrical lines of the data communication cable.

19. A method comprising:

receiving, by a controller of a modular riser card, a first electrical signal via a first signal input coupled to one pad of a first pair of pads electrically isolated from each other and disposed on a circuit board of the modular riser card, wherein the pad of the first pair of pads is electrically connected to a first power terminal;

receiving, by the controller, a second electrical signal via a second signal input coupled to one pad of a second pair of pads electrically isolated from each other and disposed on the circuit board, wherein the pad of the second pair of pads is electrically connected to a second power terminal, wherein the modular riser card further comprises a removable connector assembly including a connector body mounted on and detachably connected to the circuit board and a clip coupled to the connector body; and determining, by the controller, a type of modular riser card pin connection based on the first and second electrical signals, wherein the clip electrically bridges one of the first pair of pads to each other or the second pair of pads to each other and causes one of the first electrical signal or the second electrical signal to have a first voltage and the other one of the first electrical signal or the second electrical signal to have a second voltage.

20. The method of claim 19, wherein, communicating, by the controller the type of modular riser card pin connection to a host controller of an electronic device, and wherein the type of modular riser card pin connection comprises one of an 8-pair pin connection or a 16-pair pin connection.

* * * * *